US008490132B1

(12) United States Patent
Shi et al.

(10) Patent No.: US 8,490,132 B1
(45) Date of Patent: Jul. 16, 2013

(54) SNAPSHOT BASED VIDEO ADVERTISING SYSTEM

(75) Inventors: Yifan Shi, Sunnyvale, CA (US); Hai Fang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 12/631,516

(22) Filed: Dec. 4, 2009

(51) Int. Cl.
*G06F 3/00* (2006.01)

(52) U.S. Cl.
USPC ........... 725/42; 725/32; 725/41; 725/112; 725/135; 348/14.01; 348/14.03; 386/359; 386/E5.001; 455/454

(58) Field of Classification Search
USPC ............................. 725/32, 41, 42, 112, 135
See application file for complete search history.

(56) References Cited

U.S. PATENT DOCUMENTS

| | | | |
|---|---|---|---|
| 2002/0083469 A1* | 6/2002 | Jeannin et al. | 725/135 |
| 2007/0118801 A1* | 5/2007 | Harshbarger et al. | 715/730 |
| 2007/0133034 A1* | 6/2007 | Jindal et al. | 358/1.14 |
| 2007/0157228 A1* | 7/2007 | Bayer et al. | 725/34 |
| 2007/0157252 A1* | 7/2007 | Perez | 725/61 |
| 2008/0066107 A1* | 3/2008 | Moonka et al. | 725/42 |
| 2008/0077952 A1* | 3/2008 | St. Jean et al. | 725/32 |
| 2008/0276269 A1* | 11/2008 | Miller et al. | 725/34 |
| 2008/0288976 A1* | 11/2008 | Carson et al. | 725/34 |
| 2010/0131358 A1* | 5/2010 | Ueshima | 705/14.45 |
| 2011/0219300 A1* | 9/2011 | Jindal et al. | 715/273 |
| 2011/0246569 A1* | 10/2011 | Tiu et al. | 709/203 |
| 2011/0314501 A1* | 12/2011 | Vaysman et al. | 725/41 |

FOREIGN PATENT DOCUMENTS

| | | |
|---|---|---|
| JP | 2008146492 A | 6/2008 |
| KR | 2009079566 A | 7/2009 |
| KR | 916717 B1 | 9/2009 |
| KR | 2009116508 A | 11/2009 |
| WO | WO2009003132 A1 | 12/2008 |

OTHER PUBLICATIONS

Notification of Transmittal of the International Search Report and the Written Opinion of the International Searching Authority, or the Declaration for PCT/US2010/058862 dated Jul. 26, 2011, 9 pages.
Notification of Transmittal of the International Preliminary Report on Patentability for PCT/US2010/058862 dated Jun. 14, 2012, 6 pages.

* cited by examiner

*Primary Examiner* — Nasser Goodarzi
*Assistant Examiner* — Paul Graham
(74) *Attorney, Agent, or Firm* — Fish & Richardson P.C.

(57) ABSTRACT

Systems and methods for delivering advertisements with a video. A video is received at a client device, and data identifying a frame of the video, and an advertisement associated with the frame of the video are identified. The video is displayed during a playback of the video on the client device, and it is determined from the data identifying the frame of the video that the frame of the video is displayed during the playback of the video. The advertisement and the frame of the video are displayed proximate to a display of the video in response to the determination.

24 Claims, 4 Drawing Sheets

SNAPSHOT BASED VIDEO ADVERTISING SYSTEM

BACKGROUND

This disclosure relates to online advertising.

Advertisers can choose to provide advertisements to be displayed with videos provided on web pages. The advertisements can be displayed in a number of ways. For example, the advertisements can be displayed outside of a display of the video at the end of the video. Displaying the advertisement after the video, however, typically results in the advertisements being shown for a short period of time because once the video is over, the viewer will likely select another video or leave the web page on which the video is displayed without clicking on the advertisement. In another example, some advertisements are shown inside the video display, for example, every few minutes during the playback of the video. In this case, however, viewers will most likely fast forward through these advertisements so they can go back to viewing the video instead of the advertisements.

SUMMARY

In general, the subject matter of this specification relates to systems and methods for displaying advertisements with videos. One aspect of the subject matter described in this specification can be embodied in a method including receiving at a client device a video, data identifying a frame of the video, and an advertisement associated with the frame of the video; displaying the video during a playback of the vide on the client device; determining from the data identifying the frame of the video that the frame of the video is displayed during the playback of the video; and displaying the advertisement and the frame of the video proximate to a display of the video in response to the determination. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to displaying advertisements with frames of a video. A frame is one of many still images that are used to compose a video. An advertiser can associate advertisements with various frames of the video. The advertisements can be associated with the video either by a particular time index of the video or with a frame number of the video. When the time index of the video has been reached, or when the frame number has been reached, the advertisement as well as the frame is displayed proximate to the video player.

Figure 1A:
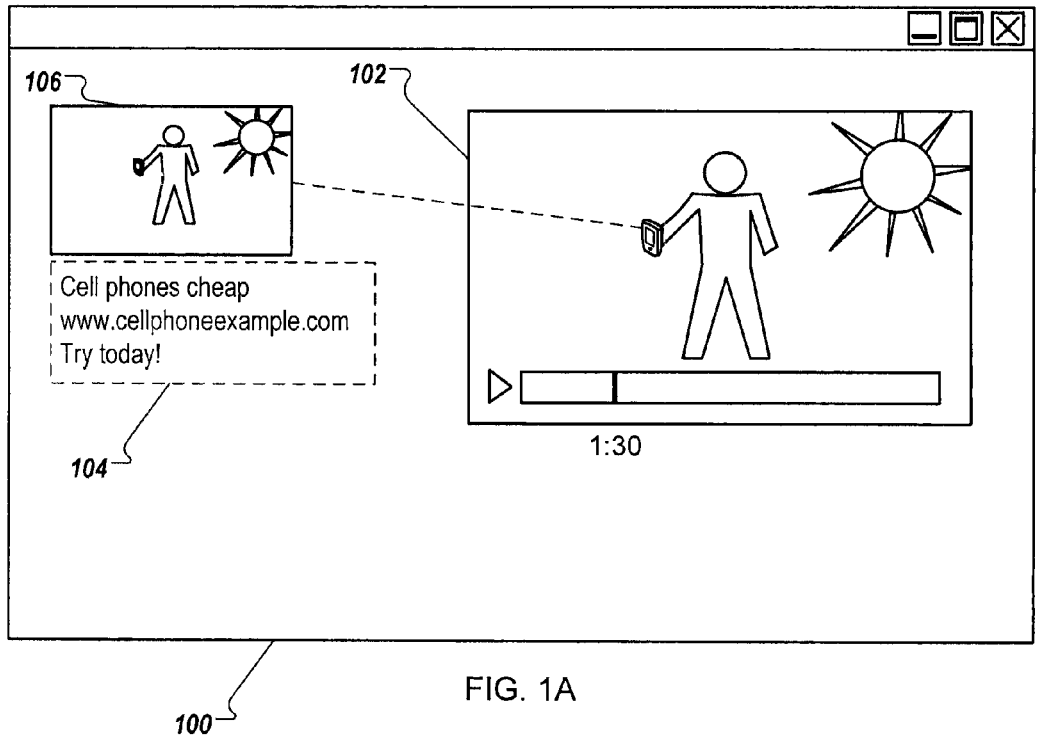
FIGS. 1A and 1B are an example web page that displays a video and related advertisements.

FIG. 1A is an example web page that displays a video, frames of the video, as well as advertisements associated with the frames. A web browser receives a web page 100 that initially includes a display of a video 102. Data identifying different frames of the video 102, such as a frame number or a time index of the video 102, as well as advertisements associated with the frames are also received by the web browser. The advertisements can be associated with the frames of the video 102 by advertisers associated with the advertisements. The advertisements can be associated with the frames by either a frame number of the video 102, for example, an advertisement associated with frame #500, or by a time index that identifies an approximate time that the frame occurs in the video, for example an advertisement associated with the frame at time index 4:20.

In this example, an advertiser associated with advertisement 104 wants the advertisement 104 displayed when the frame at time index 1:30, e.g., frame 106, of the video 102 is displayed. The advertisement 104 is about cell phones and therefore the advertiser decides that the advertisement 104 is to be shown during playback of the video 102 when the specific frame including a cell phone at time index 1:30 is shown.

During playback of the video 102, the client device determines that the frame 106 of the video 102 at time index 1:30 has been associated with an advertisement. Therefore, at time index 1:30, the web browser displays the advertisement 104 proximate to the display of the video 102 with the frame 106 of the video that occurs at time index 1:30. In this example, the frame 106 of the video 102 at time index 1:30 is of the man holding a cell phone. The frame 106, as well as the advertisement 104 about the cell phone, are displayed together. Alternatively, an advertiser can associate an advertisement with the video 102 using a specific frame number instead of a time index, as will be described below.

In some implementations, the advertisement 104 and the frame 106 are displayed to the left of the display of the video 102 at a first scale for several seconds, and then the advertisement 104 and the frame 106 are displayed at a second scale (e.g., at a size that is small that the size of the first scale) below the display during the rest of the playback of the video 102.

Figure 1B:
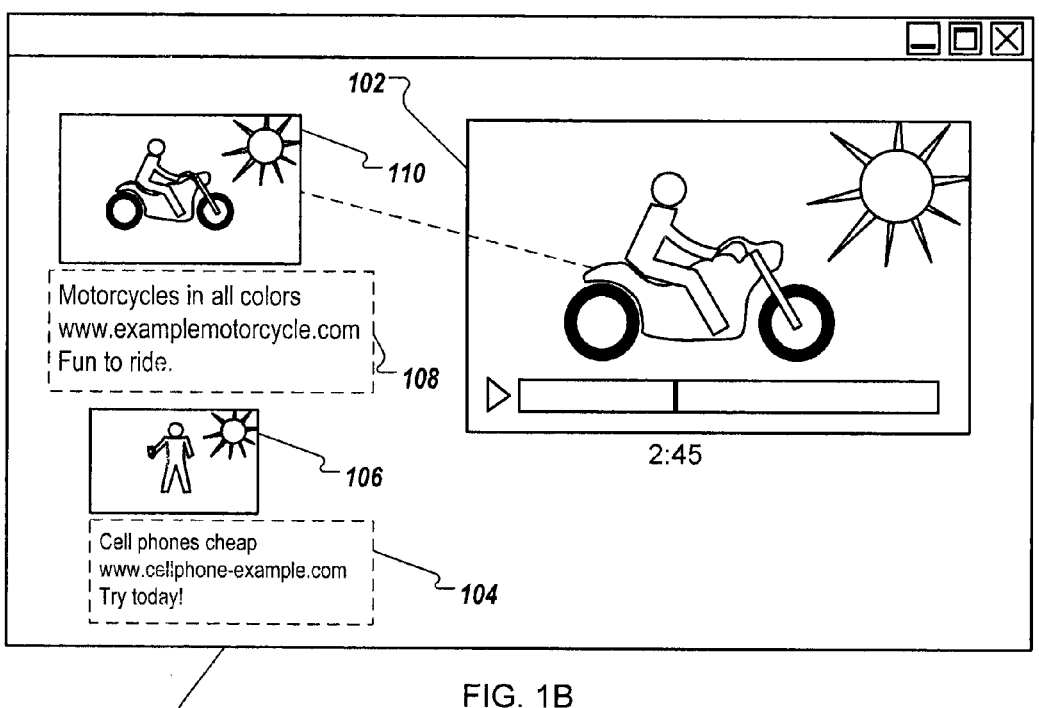

FIG. 1B is the example web page of FIG. 1A showing the video 102 at a different time index. The video 102 continues playback and after a predetermined amount of time, the advertisement 104 is minimized and displayed beneath the display of the video 102. For example, the advertisement 104 is displayed for several seconds and then minimized while the video 102 continues playing.

The web browser then determines that frame 110 of the video 102 is also associated with an advertisement. Another advertiser, e.g., a motorcycle dealer, may have bid on the keyword "motorcycle," and therefore, the advertisement 108, which relates to motorcycles, would be presented when a request is received with the keyword "motorcycle." The video 102 is tagged with the keyword "motorcycle" either by a publisher of the webpage 100 or by an owner of the video 102 at frame 110. When the web browser determines that video 102 reaches frame 110, a request can be sent to a server for advertisements responsive to the keyword "motorcycle." The advertisement 108 can be received at the web browser and is displayed proximate to the video 102 along with the frame 110. Alternatively, the request can also include the frame number or the time index and advertisement 108, which has been associated with the frame number or the time index by an advertiser can be identified and sent to the web browser. In some implementations, advertisement 108 can be received by the web browser at the same time that advertisement 104 is received.

Again, the advertisement 108 and the frame 110 can be displayed for a predetermined amount of time and then minimized. Alternatively the advertisement 108 and frame 110 can be displayed until the next time the web browser determines that another advertisement associated with a different frame is to be shown. At that time, the advertisement 108 and the frame 110 are minimized.

A user can click on the advertisement 104 or 108 and be directed to a landing page associated with the respective advertisement. The advertisements 104 and 108 can be displayed beneath the display of the video 102 until the end of the video is reached.

§1.0 Example Operating Environment

Figure 2:
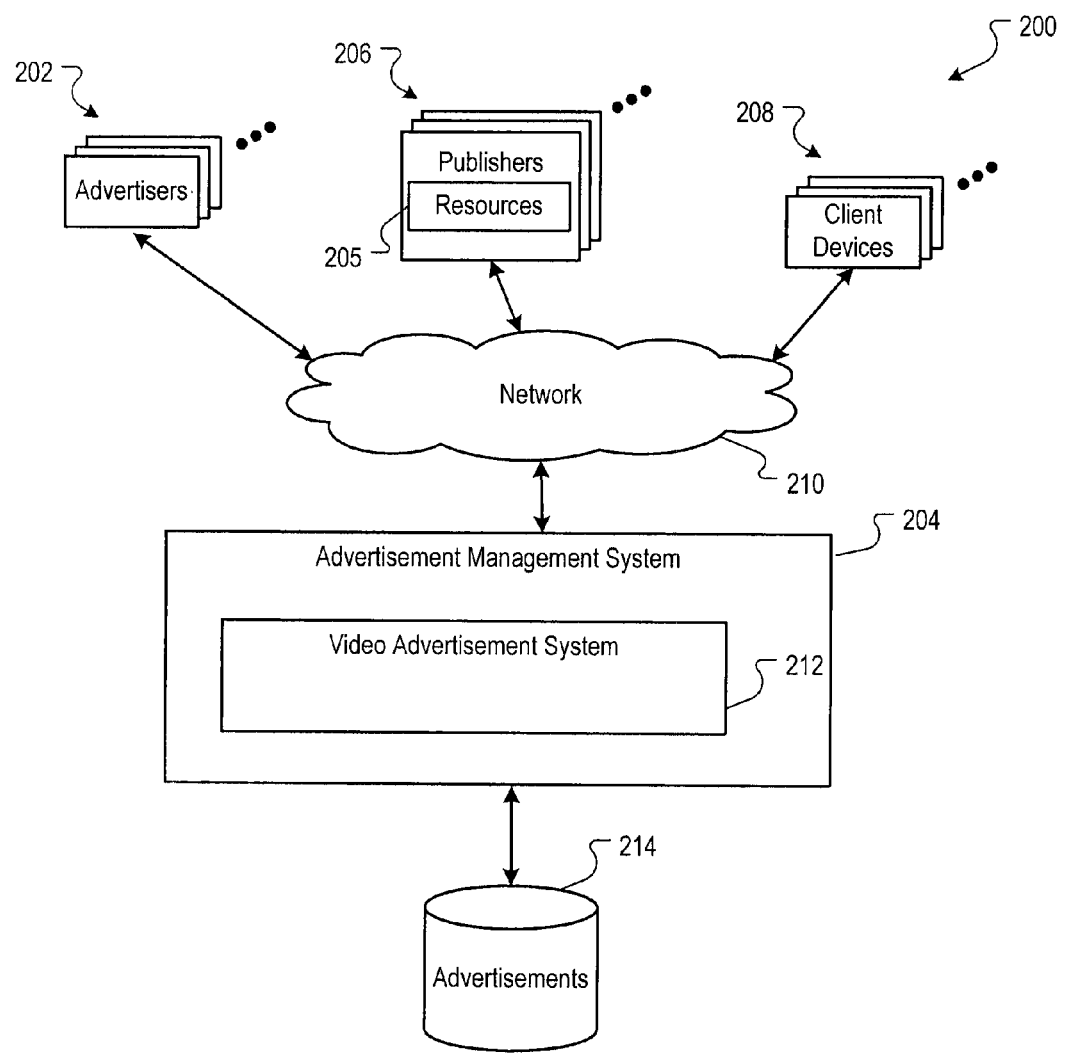
FIG. 2 is a block diagram of an example environment in which a video advertisement system can be implemented.

FIG. 2 is a block diagram of an example environment 200 in which a video advertisement system 212 can be implemented. The online environment 200 can facilitate the identification and serving of web content, e.g., web pages, advertisements, etc., to users. A computer network 210, such as a local area network (LAN), wide area network (WAN), the Internet, or a combination thereof, connects advertisers 202, an advertisement management system 204, web sites 206, and client devices 208. The online environment 200 may include numerous advertisers 202, web sites 206 and client devices 208.

One or more advertisers 202 can directly, or indirectly, enter, maintain, and track advertisement information in the advertising management system 204. The advertisements can be in the form of graphical advertisements, text advertisements, or a combination of both. These advertisement can be shown with the videos as described below.

In some implementations, if more than one advertiser has indicated to associate an advertisement with a particular frame of the same video, advertisements can be selected using an auction process. The advertisement with the highest rank is the one that is selected to be displayed with the frame.

The advertisement management system 204 includes the video advertisement system 212. Advertisers 202 can select to associate advertisements with videos and the advertisements are displayed when a specified frame or time index of the video is shown. In some implementations, the advertiser 202 can select frames of videos when defining the campaign. For example, the advertiser can select a certain video as well as specific frame or time index of a frame of the video to associate with an advertisement.

The advertisers 202 are permitted to select, or bid, an amount they are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of an advertisement based on a keyword.

The position or rank of an advertisement, such as which advertisement is the top ranking advertisement that is to displayed with a frame of the video, can be based a function of the cost-per-click multiplied by a quality score associated with the advertisement. A quality score can be the basis for measuring the quality and relevance of an advertisement. The quality score can, for example, be determined by the advertisement's click-through rate, the relevance of the advertisement text, overall historical keyword performance, and the user experience on a landing page associated with the advertisement. Other parameters can also be used to determine a quality score. The rank of an advertisement that is displayed can be determined by multiplying the maximum cost-per-click for the advertisement by a quality score of the advertisement. The advertisement can then be placed among other advertisements in order of increasing or decreasing rank.

Advertisements can be selected to be displayed with the frame of a video based on the rank. For example, a video can be tagged at different frames with keywords. The keywords can describe the contents of the video at each frame. The keyword can be used to select one or more advertisements that are responsive to the keywords. If more than one advertisement is responsive to the keywords, the advertisement selected can be based on the rank of the advertisements based on the quality score. The highest ranking advertisement is then selected to be shown with the associated frame.

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. The advertisements, associated usage data, and bidding parameters described above can be stored as advertisement data in an advertisement data store 214. An advertiser 202 can further manage the serving of advertisements by specifying an advertising campaign. The data defining an advertising campaign can be stored in the advertisement data store, which can, for example, specify advertising budgets for advertisements, and when, where and under what conditions particular advertisements may be served for presentation, as well as indicating frames of videos that advertisements are to be displayed with.

A web site 206 is a one or more web page resources 205 associated with a domain name, and each web site is hosted by one or more servers. An example web site is a collection of web pages formatted in hypertext markup language (HTML) that can contain text, graphic images, multimedia content, and programming elements, such as scripts. Each web site 206 is maintained by a publisher, e.g., an entity that manages and/or owns the web site. For brevity, the term "publisher" will also be used to refer to a web site 206 that is managed and/or owned by the publisher. Publishers can include general content servers that receive requests for content, such as videos, and retrieves the requested content in response to the request.

A client device 208 is an electronic device that is under the control of a user and is capable of requesting and receiving data over the network 210. A client device 208 typically includes a user application, such as a web browser, to facilitate the sending and receiving of data over the network 210, such as requesting a resource (e.g., page content) from a publisher 206. Example client devices 208 include personal computers, mobile communication devices, and other devices that can send and receive data over the network 210.

§2.0 Exemplary Process for Displaying Advertisements with Video

Figure 3:
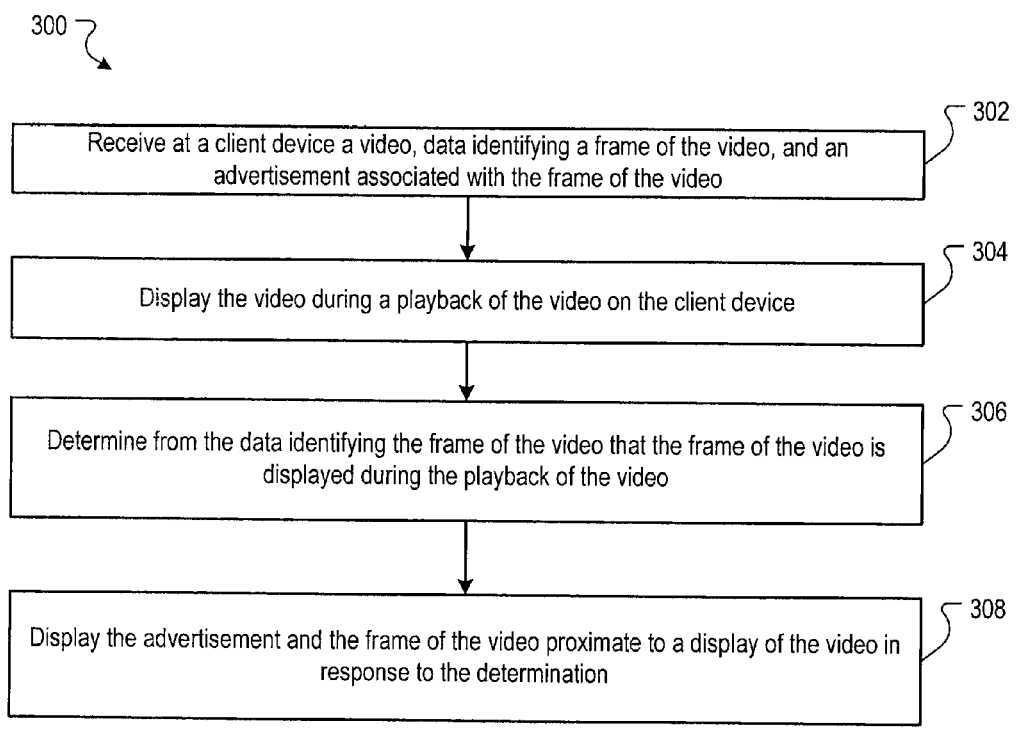
FIG. 3 is a flow diagram of an example process for displaying advertisements with videos.

FIG. 3 is a flow diagram of an example process 300 for providing advertisements with videos. The process 300 can be implemented in the video advertisement system 212 of FIG. 2.

Data identifying a frame of a video and an advertisement associated with the frame of the video is received at a client device (302). The data can be specified by an advertiser using the video advertisement system 212 when the advertiser is providing an advertisement to the advertisement management system 204. The advertiser can, for example, specify the parameters of the advertisement, a bid amount, as described above, as well as a frame number of a specific video or a time index of the video to associate with the advertisement. If more than one advertisement is associated with the same frame, the video advertisement system 212 can identify the advertisement associated with the highest bid, as described above.

In some implementations, the video can be tagged with keywords and the advertisements can be selected by the video advertisement system 204 based on the keywords. For example, the advertisement can be responsive to the keywords. The keywords can be terms describing contents of the video. When the advertisement is selected, the video advertisement system 212 can associate the advertisement with the video at the frame where the keywords were embedded using the data such as a frame number of the video or the time index. The advertisement, as well as the data, can then be sent to the client device.

Whenever the specified frame is displayed during playback of the video or the time index has been reached, the advertisement and the frame are displayed with the video for a predetermined amount of time.

The video is displayed during a playback of the video on the client device (304). The video can be a video a web page presented on a publisher page. The video can also be a video displayed on a search results page. Playback can be initiated automatically by a web browser, or it can be initiated by a user.

The client device determines from the data identifying the frame of the video that the frame of the video associated with an advertisement is displaying during the playback (306). The client device 208 can determine that the frame specified by an advertiser is displayed during playback of the video. Alternatively, the client device 208 can determine that the time index specified by the advertiser has been reached during the playback of the video. The determination can be made using instructions embedded with the video that include instructions to display the advertisements and the frames at specific points in the video. Alternatively, JavaScript API or Flash API associated with the video can be used to make the determination of when to display.

In some implementations, the advertisements are not received at the client device prior to the video being displayed. When a determination is made from the data identifying the frame that a frame associated with an advertisement is displayed on the video during playback, a request is sent to the video advertisement system 212 that includes one or more keywords. The video is tagged with the keywords at the portion of the video that the frame is located. The request can include either a frame number of the video or a time index associated with the video. The keywords can also include an identifier associated with the video. For example, a request may be "video ID=4334, frame=405." Alternatively, the request may be "video ID=4334, time index=2:34." The video advertisement system 212 therefore can identify the video using the video ID and then the frame using the frame number or the time index. The video advertisement system 212 can then identify an advertisement associated with the frame. For example, an advertiser may have indicated to associate an advertisement with video ID 4334 at time index 2:34. If more than one advertisement is associated with the video ID 4334 and time index 2:34, the advertisement associated with the highest bid is selected.

In some implementations, as described above, if the keywords include terms describing the video, the video advertisement system 212 can also identify the advertisement that is responsive to these terms. For example, a request may be "keyword=motorcycle." The video advertisement system 212 can select advertisements responsive to "motorcycle" through the auction process and then provide the advertisement associated with the highest bid, as described above.

In some implementations, the request can include keywords that include terms describing the video as well as a video identifier and a time index or frame number. For example, the request can be "keyword=motorcycle, video ID=4334, time index=1:42." The video advertisement system 212 therefore can identify the video using the video ID and then the frame using the time index. If more than one advertiser bid on the keyword "motorcycle" and also selected the video associated with video ID 4334 and time index 1:42 to associate with an advertisement, the advertisement that is selected is the one that is associated with the highest bid.

The advertisement received at the client device and the frame of the video are displayed proximate to a display of the video (308). The frame displayed can include a snapshot of the contents of the video at the frame indicated. The frame and the advertisement can be displayed to one side of the video, e.g., the left or the right side, or above or below the display of the video. For example, in FIG. 1A, the frame includes a snapshot of the man holding a cell phone. The advertisement includes a creative "Cell phones cheap—www.cellphoneexample.com Try today!"

In some implementations, the frame and the associated advertisement can be displayed in a first state for a predetermined amount of time. The advertiser or publisher of the web page displaying the video can specify the amount of time. For example, the frame and the advertisement can be displayed for three seconds and then minimized for display underneath the display of the video. In some implementations, advertisements can only be associated with frames that are a predetermined number of seconds apart. A frame can have an associated advertisement but the next frame that can have an associated advertisement will be a predetermined number of seconds later. For example, an advertisement can be associated with a frame at time index 1:00, and the next frame cannot be earlier than 5 seconds, so not earlier than time index 1:05.

In some implementations, the frame of the video and the advertisement associated with the frame are displayed proximate to the video until the end of the video. In other implementations, the frame of the video and the advertisement are only displayed until the next frame is reached during playback that is associated with an advertisement and the new frame and associated advertisement replace the existing frame and advertisement.

Upon a selection of the advertisement, a request is sent from the client device to the video advertisement system 212 for a landing page associated with the advertisement. The landing page can then be displayed on the client device 208 in a separate web page than the web page displaying the video. In some implementations, the landing page can replace the web page displaying the video.

3.0 Example Processing System

Figure 4:
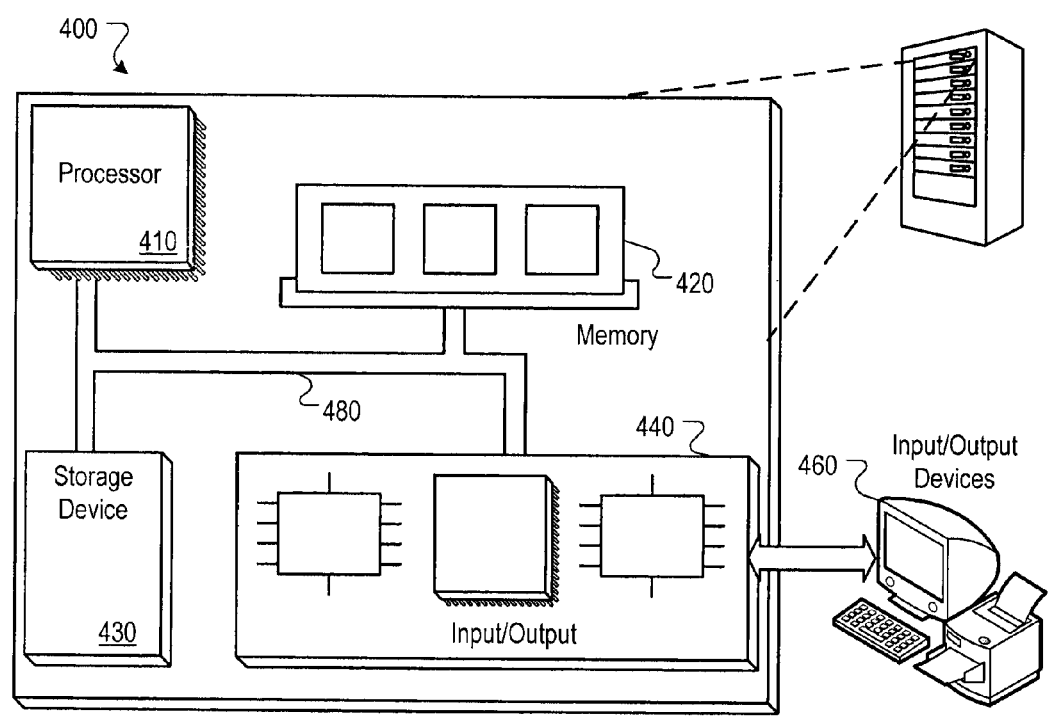
FIG. 4 is block diagram of an example computer system.

FIG. 4 is block diagram of an example computer processing system 400 that can be used to allocate and provide advertisements in response to impression events corresponding to forecasted impressions based on forecasting data and advertisement availability data. The system 400 can be used to realize a variety of different types of computer devices, such as the client devices 208 or server and computer devices on which the advertisement system 204 and the video advertisement system 212 are implemented.

The system 400 includes a processor 410, a memory 420, a storage device 430, and an input/output device 440. Each of the components 410, 420, 430, and 440 can, for example, be interconnected using a system bus 480. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, etc.

Although an example processing system has been described in FIG. 4, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving at a client device a video and data identifying a particular frame of the video;
displaying frames of the video during a playback of the video in a first display area on the client device;
determining from the data identifying the particular frame of the video that the particular frame of the video is displayed during the playback of the video in the first display area;
identifying a particular advertisement, based at least in part on preference data for an advertiser of the particular advertisement, to concurrently display with the particular frame in a second display area on the client device separate from the first display area; and
in response to the determination, concurrently displaying (i) the frames of the video during the playback of the video in the first display area and (ii) the particular advertisement and the particular frame of the video in the second display area.

2. The method of claim 1, wherein the particular advertisement has been specified to be concurrently displayed with the particular frame from the video prior to the video being received at the client device.

3. The method of claim 2, wherein the particular advertisement has been specified to be concurrently displayed with the particular frame based on one or more keywords embedded into the video at a portion of the video that the particular frame is located, and wherein the particular advertisement is responsive to the one or more keywords.

4. The method of claim 1, further comprising:
issuing a request for the particular advertisement in response to determining from the data identifying the particular frame of the video that the particular frame is displayed on the video during the playback of the video; and
receiving the particular advertisement in response to the request.

5. The method of claim 4, wherein the data identifying the particular frame of the video includes one or more keywords, and the request includes the one or more keywords.

6. The method of claim 1, wherein the particular frame and the particular advertisement are displayed in the second display area until the end of the video.

7. The method of claim 1, wherein the data identifying the particular frame of the video is the particular frame of the video.

8. The method of claim 1, wherein the data identifying the particular frame of the video is a time index that identifies an approximate time that the particular frame occurs in the video.

9. A system comprising:
one or more computers; and
a non-transitory computer-readable medium coupled to the one or more computers having instructions stored thereon which, when executed by the one or more computers, cause the one or more computers to perform operations comprising:
receiving at a client device a video and data identifying a particular frame of the video;
displaying frames of the video during a playback of the video in a first display area on the client device;
determining from the data identifying the particular frame of the video that the particular frame of the video is displayed during the playback of the video;
identifying a particular advertisement, based at least in part on preference data for an advertiser of the particular advertisement, to concurrently display with the particular frame in a second display area on the client device separate from the first display area; and
concurrently displaying (i) the frames of the video during the playback of the video in the first display area and (ii) the particular advertisement and the particular frame of the video in the second display area.

10. The system of claim 9, wherein the particular advertisement has been specified to be concurrently displayed with the particular frame from the video prior to the video being received at the client device.

11. The system of claim 9, wherein the particular advertisement has been specified to be concurrently displayed with the particular frame based on one or more keywords embedded into the video at a portion of the video that the particular frame is located, and wherein the particular advertisement is responsive to the one or more keywords.

12. The system of claim 9, further comprising:
issuing a request for the particular advertisement in response to determining from the data identifying the particular frame of the video that the particular frame is displayed on the video during the playback of the video; and
receiving the particular advertisement in response to the request.

13. The system of claim 12, wherein the data identifying the particular frame of the video includes one or more keywords, and the request includes the one or more keywords.

14. The system of claim 9, wherein the particular frame and the particular advertisement are displayed in the second display area until the end of the video.

15. The system of claim 9, wherein the data identifying the particular frame of the video is the particular frame of the video.

16. The system of claim 9, wherein the data identifying the particular frame of the video is a time index that identifies an approximate time that the particular frame occurs in the video.

17. One or more non-transitory computer readable media storing instructions executable by a processing system, and upon such execution cause the processing system to perform operations comprising:
receiving at a client device a video and data identifying a particular frame of the video;

displaying frames of the video during a playback of the video in a first display area on the client device;

determining from the data identifying the particular frame of the video that the particular frame of the video is displayed during the playback of the video;

identifying a particular advertisement, based at least in part on preference data for an advertiser of the particular advertisement, to concurrently display with the particular frame in a second display area on the client device separate from the first display area; and in response to the determination, concurrently displaying (i) the frames of the video during the playback of the video in the first display area and (ii) the particular advertisement and the particular frame of the video in the second display area.

18. The method of claim 1, wherein the particular advertisement and the particular frame are displayed in the second display area during a first time period, the method further comprising;

determining that the first time period has expired;

in response to determining that the first time period has expired, reducing a size the second display area displaying the particular advertisement and the particular frame to a reduced size; and wherein the concurrent display comprises concurrently displaying (i) the particular advertisement and the particular frame of the video in the second display area with the reduced size after the first time period has expired and (ii) the frames of the video during the playback of the video in the first display area.

19. The method of claim 18, further comprising;

receiving data identifying a second frame of the video different from the first frame;

determining from the data identifying a second frame of the video that the second frame of the video is displayed during the playback of the video;

identifying an advertisement, different from the particular advertisement, based at least in part on preference data for an advertiser of the advertisement, to concurrently display with the second frame; and in response to the determination that the second frame of the video is being displayed, concurrently displaying (i) the frames of the video during the playback of the video in the first display area, (ii) the advertisement and the second frame of the video in the second display area, and (iii) the particular advertisement and the particular frame of the video in a third display area on the client device, wherein the third display area is separate from the second display area and the first display area.

20. The method of claim 19, wherein a size of the third display area is greater than the reduced size of the second display area.

21. The method of claim 1, wherein the preference data specify a time during the playback of the video corresponding to the display of the particular frame.

22. The method of claim 1, wherein the preference data specify a frame identifier of the particular frame.

23. The method of claim 1, wherein the preference data specify a keyword related to a subject matter depicted in the particular frame.

24. The method of claim 1, wherein the particular advertisement has been specified to be concurrently displayed with the particular frame during a playback of the video based on the preference data for the advertiser of the particular advertisement.

* * * * *

UNITED STATES PATENT AND TRADEMARK OFFICE
CERTIFICATE OF CORRECTION

| | |
|---|---|
| PATENT NO. | : 8,490,132 B1 |
| APPLICATION NO. | : 12/631516 |
| DATED | : July 16, 2013 |
| INVENTOR(S) | : Yifan Shi and Hai Fang |

It is certified that error appears in the above-identified patent and that said Letters Patent is hereby corrected as shown below:

On the title page, Item (56), Column 2, Line 1 – delete "Internatinal" and insert -- International --, therefor.

In the Claims

Claim 11, Column 10, Line 35 – delete "claim 9" and insert -- claim 10, --, therefor.

Signed and Sealed this
Fifteenth Day of October, 2013

Teresa Stanek Rea
*Deputy Director of the United States Patent and Trademark Office*